Nov. 24, 1936.         S. G. EASTMAN         2,061,758
BEARING
Filed Aug. 5, 1933
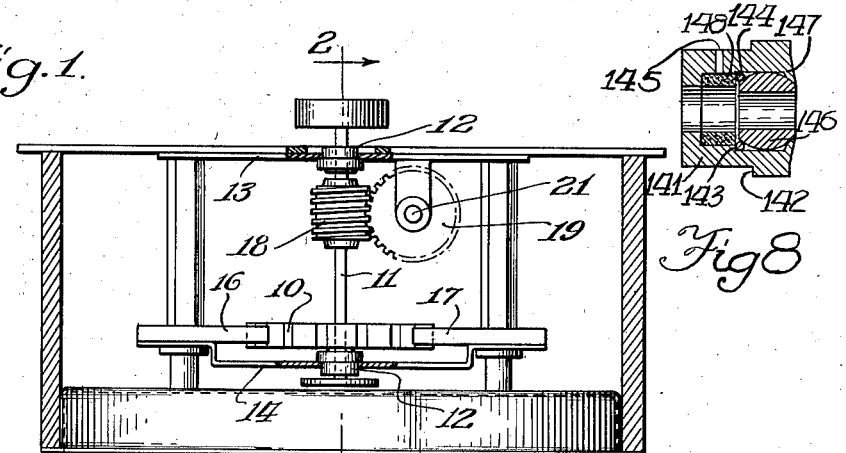
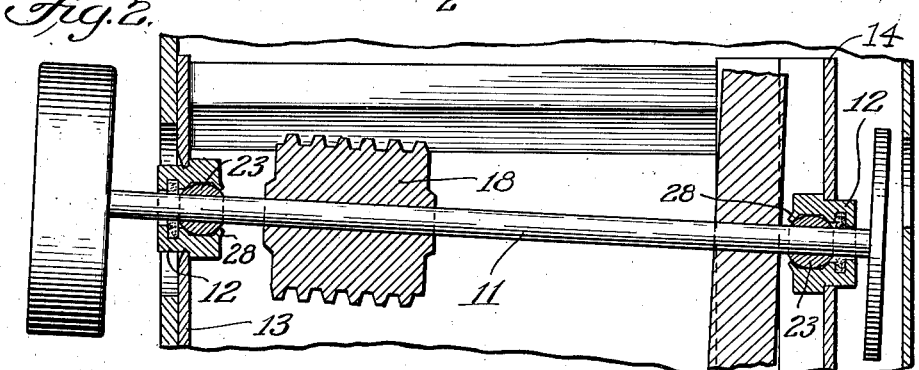
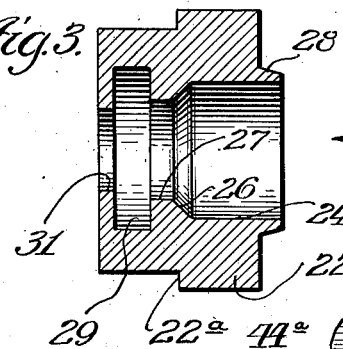
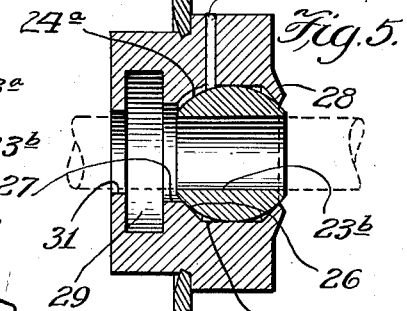
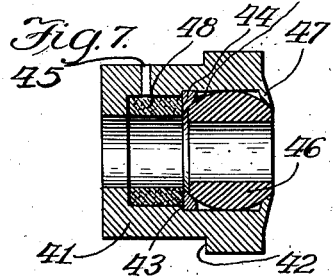
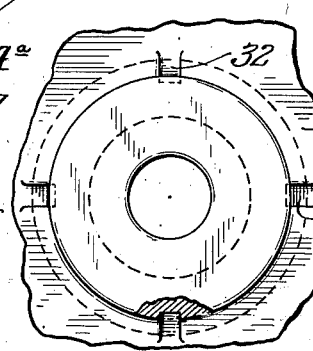
Inventor
Samuel G. Eastman.
By Mueller & McLaughlin
Attys Patented Nov. 24, 1936

2,061,758

UNITED STATES PATENT OFFICE 2,061,758

BEARING

Samuel G. Eastman, Belvidere, Ill.

Application August 5, 1933, Serial No. 683,729

22 Claims. (Cl. 308—72)

My invention relates in general to bearings. It relates more in particular to a bearing adapted for use in devices such as electric clocks, fans, mixing devices, agitators and the like.

One of the principal difficulties in producing a relatively inexpensive device, such, for example, as an electric clock powered by the usual types of small synchronous motors, is the selection of a proper type of bearing. In a relatively inexpensive article, it is impossible to manufacture and assemble parts with the same precision employed in a high grade watch for example. Nevertheless, it is expected that an electric clock will function as accurately and even more accurately than the conventional high priced time pieces.

Electric clocks and other devices of the general character indicated, now prevailing, must comprise parts which are relatively inexpensive to produce, such as parts made by a stamping operation or on an automatic screw machine. The parts also must be assembled quickly and due to the fact that relatively unskilled labor must be employed in the assembly, even though the parts employed be extremely accurate, shafts and the like may be out of alignment sometimes several thousandths of an inch. Whether the parts are out of alignment or whether they are placed out of alignment in the assembling operation, it is clear that if a shaft is sprung only very slightly to fit it between off-center bearings, friction is introduced which will either prevent the clock from running, cause it to have frequent stoppages, or else greatly decrease its life.

The principal object of my invention is the provision of improved bearing means to avoid friction in relatively small shafts.

Another object is the provision of a bearing which will be substantially self-aligning.

Another object is the provision of a bearing, two of which may be employed to support a shaft without binding, even though the frame pieces to which the bearings are attached may be out of alignment a relatively great distance.

A further object is the provision of an improved bearing of the character indicated which may be made to support a body of lubricant.

A still further object is the provision of a combination self-aligning and pack lubricated bearing for electric clocks.

Other objects and features of the invention will be apparent from a consideration of the following detailed description taken with the accompanying drawing, wherein Fig. 1 is a plan sectional view illustrating the use of the bearing on an electric clock mechanism, only so much of the clock mechanism being shown as to illustrate the invention;

Fig. 2 is an enlarged transverse sectional view taken on the line 2—2 of Fig. 1;

Figs. 3 and 4 are enlarged sectional views showing the component parts of the bearing;

Fig. 5 is an enlarged sectional view showing the component bearing parts assembled and indicating one manner of supporting the bearing in the frame;

Fig. 6 is an enlarged face view also showing the bearing supported in a frame;

Fig. 7 shows a modified form of the invention; and

Fig. 8 is a further modified form.

I shall refer briefly first to Fig. 1, which shows more or less schematically some of the parts of an electric clock mechanism including a rotor 10 and rotor shaft 11. Bearings 12—12, which may be bearings produced in accordance with my invention, are supported in frame pieces 13 and 14. The rotor is disposed between a pair of magnetic members 16 and 17 which, with the usual alternating current coil (not shown), constitute the stator of the synchronous motor. In the form of clock shown, a worm 18 is carried by the rotor shaft and meshes with a worm gear 19 carried on a shaft 21. From the shaft 21, the movement is conveyed by suitable gearing (not shown) to propel time indicating members such as electric hands (not shown) at proper speed.

Referring now to Figs. 3, 4 and 5, my improved bearing comprises a bearing housing 22, which comprises the outer portion of the bearing, and a bearing journal 23 adapted to constitute the inside portion of the bearing. Within the housing portion, I provide a general cylindrical portion 24 and a shoulder 26, communicating with an annular portion 27 of slightly decreased diameter. The bearing journal 23 has its outside portion 23a arc shaped about the center thereof, as an axis, so that when the journaled portion is disposed in the housing portion as indicated in Fig. 5, it is free to move in any direction the same as a sphere. The housing portion has an annular lip 28 which is clinched down around the arcuate surface 23a to hold the journaled portion with just enough tension to support it, but not enough tension to prevent its moving around relatively freely. It may be noted from an inspection of Fig. 5, that the arcuate portion 23a engages the inside of the housing portion in three places running entirely around the arcuate portion. This holds the journaled portion with ample rigidity but does not prevent it from assuming a position, as indicated in Fig. 2 to compensate for the frame plates 13 and 14 being out of axial alignment.

Next to the circular portion 27 is an annular cut-away portion 29 adapted to be filled with a suitable oil or grease so as to maintain a continuous lubrication over a relatively long period. A restricted portion 31 is made relatively slightly larger than the shaft 11, which is journaled in the surface 23b of the journaled portion of the bearing. The relative spacing is indicated in Fig. 5. This arrangement closes off the portion 29 to form substantially a closed reservoir for the oil or grease, but still allows enough movement of the shaft to compensate for irregularities. An oil hole 30 is provided for re-oiling, and the housing adjacent the arc shaped portion 23a may be slightly cut away at one point as at 24a for the same purpose.

The bearing housing member, of course, may be formed of any suitable shape to attach it to a frame member. One simple expedient is shown in the drawing in which a housing is formed with a shoulder 22a producing a portion having a relatively larger outside diameter and another portion having a relatively smaller inside diameter. The smaller inside diameter portion is inserted through an annular aperture in a frame member, which may, for example, be a frame member as shown at 13. The frame member being suitably supported is then stake punched as at 32 (Fig. 6) causing some of the material of the frame plate to be forced into and against the outer portion of the bearing housing thereby supporting the bearing frictionally.

There are several advantages of the bearing of my invention, both from the standpoint of economy of construction, economy and speed of assembly, and advantages in operation and long life. The two parts making up the bearing preferably are screw machine parts and may be any suitable materials, such as bronze, brass, mild steel, or the like. The two parts may be either of the same material or of different materials. I may also employ a molding composition in the bearing journaled portion 23. The well known molded or formed oilless bearing usually consisting of a mixture of graphite, oil and a brass or bronze alloy, is suitable for the purpose. The two portions are made separately and afterward assembled to form a final product, as indicated in Fig. 5. Both of these parts are relatively inexpensive to manufacture and relatively very simple to assemble.

In employing the bearing, the reservoir portion 29 is preferably pack lubricated either before or after the bearings are assembled to frame members. Even though the bearing centers are slightly out of alignment, the shaft can be journaled in them by even an unskilled laborer without giving thought as to binding or whether or not the bearings are aligned sufficiently to avoid friction. In this case, the bearings align themselves, as shown in Fig. 2. This figure has been exaggerated for the purpose of illustrating the principle, but, even though it is exaggerated, it will be seen that the rotor shaft 11 is still not sufficiently out of alignment to prevent its satisfactory operation with the rotor, and the worm 18 can still be made to mesh with perfect satisfaction with the worm gear 19. With this arrangement, there is no unusual friction to place an added load on the rotor and moreover the load, whatever it is, will be uniform substantially throughout the life of the clock. Due to the fact that the bearings receive constant lubrication, the clock should run indefinitely, as the principal source of trouble which might cause stoppage thereof is in the bearings.

Those skilled in the art will understand that although I refer to the portion 29 as a lubricant reservoir, I may use in this reservoir any suitable means for obtaining the proper lubrication, such as an oil soaked felt washer, heavy oil or hard grease. This reservoir may also have a different shape, but I prefer the form shown because it lends itself to manufacture economically by screw machine operation.

In the arrangement shown in Fig. 7, I provide a tubular body portion 41 having a shoulder 42 on the outside for facilitating attachment to a frame and a shoulder 43 on the inside against which a removable ring 44 bears. The bearing portion 46 has one edge bearing against the ring 44 and the other edge confined by the annular lip 47. A felt washer 48 is shown inserted in the reservoir through which the shaft passes. An oil hole 45 is provided for re-oiling if necessary. A small cut-away portion 44a may also be provided in the ring 44 for oiling purposes.

The advantage of the form shown in Fig. 7 is that it simplifies manufacture, facilitates the insertion of the washer, and allows the manufacturer to work to a wider tolerance, which can be compensated for in assembly.

Fig. 8 employs the same principle as Fig. 7, except that the member 144 is a formed piece of wire, by the use of which cost of production is decreased. The wire has its ends slightly separated, whereby the wire loop or split ring can be slightly collapsed to insert it into the body portion, where it can expand into engagement with the shoulder 143. The open space between the ends of the wire ring also functions as an oil passage. In Fig. 8 the same numerals are employed as in Fig. 7, but with a one (1) as a prefix.

I have described my invention as being particularly adaptable to relatively very small shafts, such as in small clock movements, but those skilled in the art will understand that my invention can also be applied to other types of shafts and other sizes of shafts, without consideration as to the purpose for which they are used.

I have described my invention in detail so that those skilled in the art may understand and practice the same. It will be understood, however, that the bearing may be modified without departing from the scope of the appended claims.

What I claim as new and desire to protect by Letters Patent of the United States is:

1. In a bearing of the character described, an unitary, one-piece housing having an annular opening therein, a second annular opening of decreased diameter and connected by a shoulder, a journal having an exterior surface of substantially the same diameter as the first mentioned annular opening in the housing, said journal being disposed in the housing, means integral with the housing and bearing against a part of the outer arcuate surface of the journal to support the journal within the housing, said housing including a relatively large diameter hollow portion forming a lubricant reservoir connected to the portion of the housing in which the journal is disposed, and another portion communicating with the reservoir and having a slightly greater diameter than the inside diameter of the journal, and packing saturated with lubricant within the lubricant reservoir, whereby a shaft extending through the housing is free to take an angular position with respect to the axis of the housing.

2. In a bearing for a rotatable shaft, a housing, a shoulder in said housing providing two portions of different diameter, a ring engaging against said shoulder, a journal having an outer surface forming a part of an arc, said outer surface bearing against said ring and against the interior surface of the housing, means on the housing for retaining said journal therein, said ring forming a side wall of an oil reservoir, and packing saturated with lubricant disposed in the reservoir and engaging the shaft.

3. In a self-aligning bearing for a shaft, an integral one-piece housing, means for supporting said housing in a circular orifice of a flat frame member, a pair of generally annular openings within said housing, a smaller diameter shoulder between said pair of openings, a shoulder at an outside end of one opening, a shaft journal of generally spherical outside shape lying in one opening between said shoulders and engaging the inside wall of said opening in essentially only a line contact, and means for supporting lubricant within the other opening.

4. In a bearing of the character described, a housing having a generally annular central inner cylindrically walled opening therein, a second annular opening of decreased diameter and connected by a shoulder, a journal having a substantially continuous exterior surface of generally arcuate shape and the greatest diameter of which is of substantially the same diameter as that of the first mentioned annular opening in the housing, said journal being disposed in the first mentioned annular opening in said housing, and means integral with the housing and bearing against a part of the outer arcuate surface of the journal to support the journal within the first mentioned annular opening in the housing.

5. In a bearing for a rotatable shaft, an unitary, one-piece housing, a shoulder in said housing providing two inner cylindrically walled portions of different diameter, a ring engaging against said shoulder, an unitary, one-piece journal having an outer surface forming a part of an arc, a part only of said outer surface bearing against said ring and against the interior surface of only one of the cylindrically walled portions of the housing, and means on the housing for retaining said journal therein.

6. In a bearing for a rotatable shaft, a housing, a shoulder in said housing providing two portions of different diameter, a ring engaging against said shoulder, a journal having an outer surface forming a part of an arc, said outer surface bearing against said ring and against the interior surface of the housing, the contact between the outer surface of the journal and the interior surface of the housing being essentially a line contact, and means on the housing for retaining said journal therein, said means having a slanting surface and being integral with the housing whereby the journal may be held firmly but is allowed shifting movement within the housing.

7. A bearing comprising a housing having a generally annular outer surface, means for retaining said housing in a circular orifice of a flat frame member, said housing having a relatively large diameter generally cylindrically hollow portion, a journal member having a generally spherical outer contour carried by and adjustable in the generally cylindrical hollow portion of said housing, the contact therebetween being essentially only a line contact, and means integral with the housing for retaining the journal member therein.

8. A bearing comprising a housing, means for supporting the housing in a circular orifice of a flat frame plate, said housing having a continuous longitudinal bore the outer periphery of which has a cylindrically walled inner surface for supporting a shaft, a shoulder in the housing, a journal member having a generally spherical outer surface bearing against the outer periphery of said bore to provide essentially only a line contact therebetween, and an integral shoulder on an outer face of said housing bearing against the spherical surface of said journal to hold the same adjustably within the housing.

9. A bearing as defined in claim 8, wherein the supporting means for the housing comprises an annular exterior shoulder on the housing adapted to bear against the frame plate, the frame plate and housing being mutually deformed to prevent relative movement.

10. In a self-aligning bearing for a shaft, a housing having a substantially annular inner cylindrically walled opening therein adapted to be generally in alignment with a shaft, means for supporting said housing in a frame, a shoulder communicating with a second annular opening of decreased diameter within said housing, a generally spherical journal disposed within said first mentioned annular opening to provide essentially only a line contact therebetween, said journal having a central annular opening for receiving said shaft, and an integral annular projection on said housing engaging said spherical journal to retain it in said housing.

11. In a self-aligning bearing for a rotatable shaft, a housing, an annular shoulder in said housing providing two portions of different diameter, at least one of said portions having an inner cylindrically walled surface, a journal with an arcuate outer surface forming a part of a sphere disposed in said inner cylindrically walled journal portion, the outer spherical surface of said journal bearing against the inner cylindrically walled surface of said housing portion to provide essentially only a line contact therebetween, and means integral with the housing engaging another part of the outer surface of said journal and retaining said journal in said housing.

12. In a self-aligning bearing for a rotating shaft, an integral housing, said housing having a substantially continuous cylindrically walled inner surface, and a generally spherical shaft journal supported essentially entirely within said cylindrically walled inner surface and movable therein, the contact between the exterior surface of the shaft journal and the cylindrically walled inner surface being essentially only a single line contact, and means integral with the housing for retaining the journal therein.

13. The structure defined in claim 12, including means for supporting said housing in an opening in a flat plane frame member, said means integral with the housing for retaining the journal therein comprising a lip portion which is clinched down over the journal.

14. In a bearing for a rotatable shaft, an unitary, one-piece housing, a shoulder in said housing providing two inner cylindrically walled portions of different diameter, a ring engaging against said shoulder, an unitary one-piece journal having an outer surface forming part of an arc, said outer surface bearing against said ring and against the interior surface of only one of the cylindrically walled portions of the housing, means on the housing for retaining said journal therein, said ring forming a side wall of an oil reservoir, and packing saturated with lubricant disposed in the reservoir and engaging the shaft.

15. In a bearing for a rotatable shaft, a housing, an annular shoulder in said housing providing two spaces each having a different internal diameter, said spaces being defined by cylindrically walled inner surfaces, a removable ring engaging against said shoulder, and a shaft-supporting journal mounted in one of said spaces, said shaft-supporting journal having a generally spherical outer surface.

16. The structure defined in claim 15, including lubricating packing disposed within the space of lesser internal diameter, said packing being adapted to surround the shaft, the ring serving to engage one surface of said packing.

17. The structure defined in claim 15 wherein the contact between the shaft-supporting journal and the cylindrically walled space in which it is mounted is essentially a line contact.

18. The structure defined in claim 15, wherein the housing is an integral, one-piece body of metal.

19. The structure defined in claim 15, including means to retain the journal within the opening in the spaces in the housing.

20. The structure defined in claim 15, including means to retain the journal within the space in the housing, said means comprising a lip on the housing which is clinched over said journal.

21. In a bearing for a rotatable shaft, a housing, means forming an opening in said housing and comprising a cylindrically walled inner surface of substantially uniform diameter, a shaft-supporting journal the outer surface of which is generally spherical, said journal being supported within said opening in the housing and providing essentially only a line contact between the exterior surface of the journal and the cylindrically walled inner surface of the opening in the housing, means to retain the journal within the opening in the housing, said means being integral with and comprising a lip on the housing which is clinched over said shoulder, and a cylindrically walled inner surface in said housing and having an internal diameter smaller than the internal diameter of the first mentioned cylindrically walled surface, the two cylindrically walled inner surfaces being separated by a shoulder.

22. In a bearing for a rotatable shaft, a housing, means forming an opening in said housing and comprising a cylindrically walled inner surface of substantially uniform diameter, a shaft-supporting journal the outer surface of which is generally spherical, said journal being supported within said opening in the housing and providing essentially only a line contact between the exterior surface of the journal and the cylindrically walled inner surface of the opening in the housing, means to retain the journal within the opening in the housing, said means being integral with and comprising a lip on the housing which is clinched over said shoulder, and means defining an annular space in said housing, said space serving as an oil reservoir.

SAMUEL G. EASTMAN.